US012589268B2

(12) United States Patent
Lee et al.

(10) Patent No.: US 12,589,268 B2
(45) Date of Patent: Mar. 31, 2026

(54) VEHICLE FIRE-EXTINGUISHING AND PASSENGER-COOLING DEVICE

(71) Applicants: HYUNDAI MOTOR COMPANY, Seoul (KR); KIA CORPORATION, Seoul (KR)

(72) Inventors: Baek Hee Lee, Suwon-si (KR); Soong Un Choi, Suwon-si (KR); Kang Yen Lee, Seoul (KR); Won Seok Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 204 days.

(21) Appl. No.: 18/608,517

(22) Filed: Mar. 18, 2024

(65) Prior Publication Data

US 2025/0177789 A1 Jun. 5, 2025

(30) Foreign Application Priority Data

Dec. 4, 2023 (KR) ........................ 10-2023-0172986

(51) Int. Cl.

| | |
|---|---|
| ***A62C 3/07*** | (2006.01) |
| ***A62C 31/00*** | (2006.01) |
| ***A62C 35/02*** | (2006.01) |
| ***A62C 35/13*** | (2006.01) |
| ***A62C 35/60*** | (2006.01) |
| ***A62C 35/68*** | (2006.01) |

(Continued)

(52) U.S. Cl.

CPC .............. *A62C 3/07* (2013.01); *A62C 31/005* (2013.01); *A62C 35/023* (2013.01); *A62C 35/13* (2013.01); *A62C 35/605* (2013.01); *A62C 35/68* (2013.01); *A62C 37/40* (2013.01); *A62C 99/0018* (2013.01)

(58) Field of Classification Search

CPC ....... A62C 3/07; A62C 31/005; A62C 35/023; A62C 35/11; A62C 35/13; A62C 35/60; A62C 35/605; A62C 35/68; A62C 37/38; A62C 37/40; A62C 99/0018; B60N 2/56; B60N 2/5614; B60N 2/5642; B60N 2/5657; B60N 2/5692; B60N 2/90; B60N 2002/981; B60R 1/12; G08B 17/125

See application file for complete search history.

(56) References Cited

U.S. PATENT DOCUMENTS

| | | | | |
|---|---|---|---|---|
| 5,934,379 A * | 8/1999 | Østlyngen et al. ...... | A62C 3/07 169/46 |
| 6,334,490 B1 * | 1/2002 | Dille ........................ | A62C 3/07 239/311 |
| 2006/0032265 A1 * | 2/2006 | Shaw .................. | B60N 2/5628 62/424 |

FOREIGN PATENT DOCUMENTS

| | | | |
|---|---|---|---|
| DE | 102004024445 A1 * | 12/2005 | ............... A62C 3/07 |

* cited by examiner

*Primary Examiner* — Kyle Robert Thomas

(74) *Attorney, Agent, or Firm* — Lempia Summerfield Katz LLC

(57) ABSTRACT

A vehicle fire-extinguishing and passenger-cooling device includes a fire-extinguishing fluid spray device and a cooling gas discharge device. In the event of a vehicle fire occurring in a seat on which a passenger is seated, the fire-extinguishing fluid spray device sprays fire-extinguishing fluid around the passenger, and the cooling gas discharge device discharges, to the passenger, cooling gas to minimize burns caused by flames. As a result, the vehicle fire-extinguishing and passenger-cooling device protects the passenger from the vehicle fire and encourages the passenger to rapidly escape from a vehicle.

12 Claims, 7 Drawing Sheets

(51) Int. Cl.
*A62C 37/40* (2006.01)
*A62C 99/00* (2010.01)

VEHICLE FIRE-EXTINGUISHING AND PASSENGER-COOLING DEVICE

CROSS-REFERENCE TO RELATED APPLICATION

This application claims priority to and the benefit of Korean Patent Application No. 10-2023-0172986, filed on Dec. 4, 2023, the entire contents of which are incorporated herein by reference.

BACKGROUND

(a) Technical Field

The present disclosure relates to a vehicle fire-extinguishing and passenger-cooling device. More particularly, it relates to a vehicle fire-extinguishing and passenger-cooling device configured, in the event of a vehicle fire, to spray fire-extinguishing fluid around a passenger seated on a seat and to simultaneously discharge cooling gas toward the passenger.

(b) Background Art

Generally, a flammable fuel and a plurality of heat sources are used in a vehicle, and various electric wirings are installed therein in a complicated manner. Thus, there is a potential risk of fire occurrence.

For example, high-temperature engines and various electric devices are installed in an engine compartment, and when the engines and the electric devices are damaged or malfunction in the event of vehicle collision, a fire may occur.

Particularly, as the use of eco-friendly vehicles such as electric vehicles (EVs) increases, there is an escalating risk of fires occurring due to external impacts or internal short circuits in batteries and high-voltage electric wiring.

Furthermore, when a driver and a passenger fail to quickly escape from a vehicle in the early stage of a vehicle fire, smoke and heat generated by the vehicle fire may cause severe damage to human life.

Therefore, in the event of a vehicle fire, it is necessary to take a countermeasure to protect a passenger from a risk of burns caused by the vehicle fire and to help a passenger quickly escape from a vehicle.

The above information disclosed in this Background section is provided only to enhance understanding of the background of the present disclosure. Therefore, the Background section may contain information that does not form the prior art that is already known to a person of ordinary skill in the art.

SUMMARY

The present disclosure has been made in an effort to solve the above-described problems associated with the prior art. It is an object of the present disclosure to provide a vehicle fire-extinguishing and passenger-cooling device including a fire-extinguishing fluid spray device and a cooling gas discharge device. In the event of a vehicle fire occurring in a seat on which a passenger is seated, the fire-extinguishing fluid spray device sprays fire-extinguishing fluid around the passenger, and the cooling gas discharge device discharges, to the passenger, cooling gas to minimize burns caused by flames. As a result, the vehicle fire-extinguishing and passenger-cooling device makes it possible not only to protect the passenger from the vehicle fire, but also to encourage the passenger to rapidly escape from a vehicle.

In one aspect, the present disclosure provides a vehicle fire-extinguishing and passenger-cooling device including a fire detector mounted at a predetermined position of a vehicle and configured to detect a fire. The vehicle fire-extinguishing and passenger-cooling device also includes: a first fire-extinguishing fluid filling bag installed in a seatback of a vehicle seat; a first gas filling bag attached to an inner portion of the first fire-extinguishing fluid filling bag and configured to be inflatable in the first fire-extinguishing fluid filling bag; a second fire-extinguishing fluid filling bag installed in a seat cushion of the seat; and a second gas filling bag attached to an inner portion of the second fire-extinguishing fluid filling bag and configured to be inflatable in the second fire-extinguishing fluid filling bag. The vehicle fire-extinguishing and passenger-cooling device also includes: a plurality of spray nozzles mounted in the first fire-extinguishing fluid filling bag and the second fire-extinguishing fluid filling bag and configured to spray fire-extinguishing fluid to an outside of the seat; and a first gas generator mounted in the seat and configured to generate gas to fill the first gas filling bag and the second gas filling bag. The vehicle fire-extinguishing and passenger-cooling device also includes: a second gas generator mounted in the seat and configured to generate cooling gas to be supplied to a ventilation channel formed in a foam pad of each of the seatback and the seat cushion; and a controller configured to receive a fire detection signal from the fire detector and configured to send a current signal for gas generation to the first gas generator and the second gas generator.

In an embodiment, the fire detector may be a thermal imaging camera mounted on a rear-view mirror of the vehicle or a side-view mirror thereof.

In another embodiment, the vehicle fire-extinguishing and passenger-cooling device may further include a fire alarm configured to output a fire detection alarm sound according to a control signal from the controller.

In still another embodiment, each spray nozzle of the plurality of spay nozzles may include a nozzle bar having a predetermined length. The nozzle bar may be mounted on a front end of the first fire-extinguishing fluid filling bag or an upper end of the second fire-extinguishing fluid filling bag. Each spray nozzle of the plurality of spay nozzles may also include a nozzle tip sharply formed at an end of the nozzle bar so as to penetrate a seat cover.

In yet another embodiment, the nozzle bar may have an electric valve mounted thereon and configured to open and close according to a control signal from the controller.

In still yet another embodiment, the seat cover may have a cutting line formed thereon and cut by the nozzle tip when the nozzle bar is moved forwards.

In a further embodiment, the first gas generator may include a housing having a predetermined shape. The housing may be mounted in the seatback. The first gas generator may also include: an igniter inserted into the housing and configured to generate heat when current is applied by the controller; a propellant configured to fill a peripheral portion of the igniter in the housing and generate nitrogen gas for spraying of the fire-extinguishing fluid by the heat generated by the igniter. The first gas generator may also include: a 1-1 discharge nozzle mounted on one end of the housing and connected to the first gas filling bag via a 1-1 connection hose; and a 1-2 discharge nozzle mounted on another end of the housing and connected to the second gas filling bag via a 1-2 connection hose.

In another further embodiment, when the first gas filling bag is filled with the nitrogen gas generated by the propellant from the 1-1 discharge nozzle via the 1-1 connection hose, the first gas filling bag may be inflated such that the fire-extinguishing fluid filling the first fire-extinguishing fluid filling bag is sprayed around the seatback through the plurality of spray nozzles.

In still another further embodiment, when the second gas filling bag is filled with the nitrogen gas generated by the propellant from the 1-2 discharge nozzle via the 1-2 connection hose, the second gas filling bag may be inflated such that the fire-extinguishing fluid filling the second fire-extinguishing fluid filling bag is sprayed around the seat cushion through the plurality of spray nozzles.

In yet another further embodiment, the second gas generator may include a housing having a predetermined shape. The housing may be mounted in the seat cushion. The second gas generator may also include: an igniter inserted into the housing and configured to generate heat when current is applied by the controller; and a propellant configured to fill a peripheral portion of the igniter in the housing and generate nitrogen gas for passenger cooling by the heat generated by the igniter. The second gas generator may also include: a 2-1 discharge nozzle mounted on one end of the housing and connected to the ventilation channel formed in the foam pad of the seatback via a 2-1 connection hose; and a 2-2 discharge nozzle mounted on another end of the housing and connected to the ventilation channel formed in the foam pad of the seat cushion via a 2-2 connection hose.

In still yet another further embodiment, the nitrogen gas generated by the propellant may be discharged from the 2-1 discharge nozzle to the ventilation channel formed in the foam pad of the seatback 100 via the 2-1 connection hose. Simultaneously, the nitrogen gas generated by the propellant may be discharged from the 2-2 discharge nozzle to the ventilation channel formed in the foam pad of the seat cushion via the 2-2 connection hose. As a result, the nitrogen gas may cool a body of a passenger.

In a still further embodiment, the propellant may be obtained by mixing sodium azide and an oxidizing agent, compressing a mixture of the sodium azide and the oxidizing agent, and solidifying the mixture.

Other aspects and embodiments of the disclosure are discussed below.

It is understood that the terms “vehicle”, “vehicular”, and other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, vehicles powered by both gasoline and electricity.

The above and other features of the disclosure are discussed below.

BRIEF DESCRIPTION OF THE DRAWINGS

The above and other features of the present disclosure are now described in detail with reference to certain embodiments thereof illustrated in the accompanying drawings which are given hereinbelow by way of illustration only, and thus are not limitative of the present disclosure, and wherein.

Figure 1:
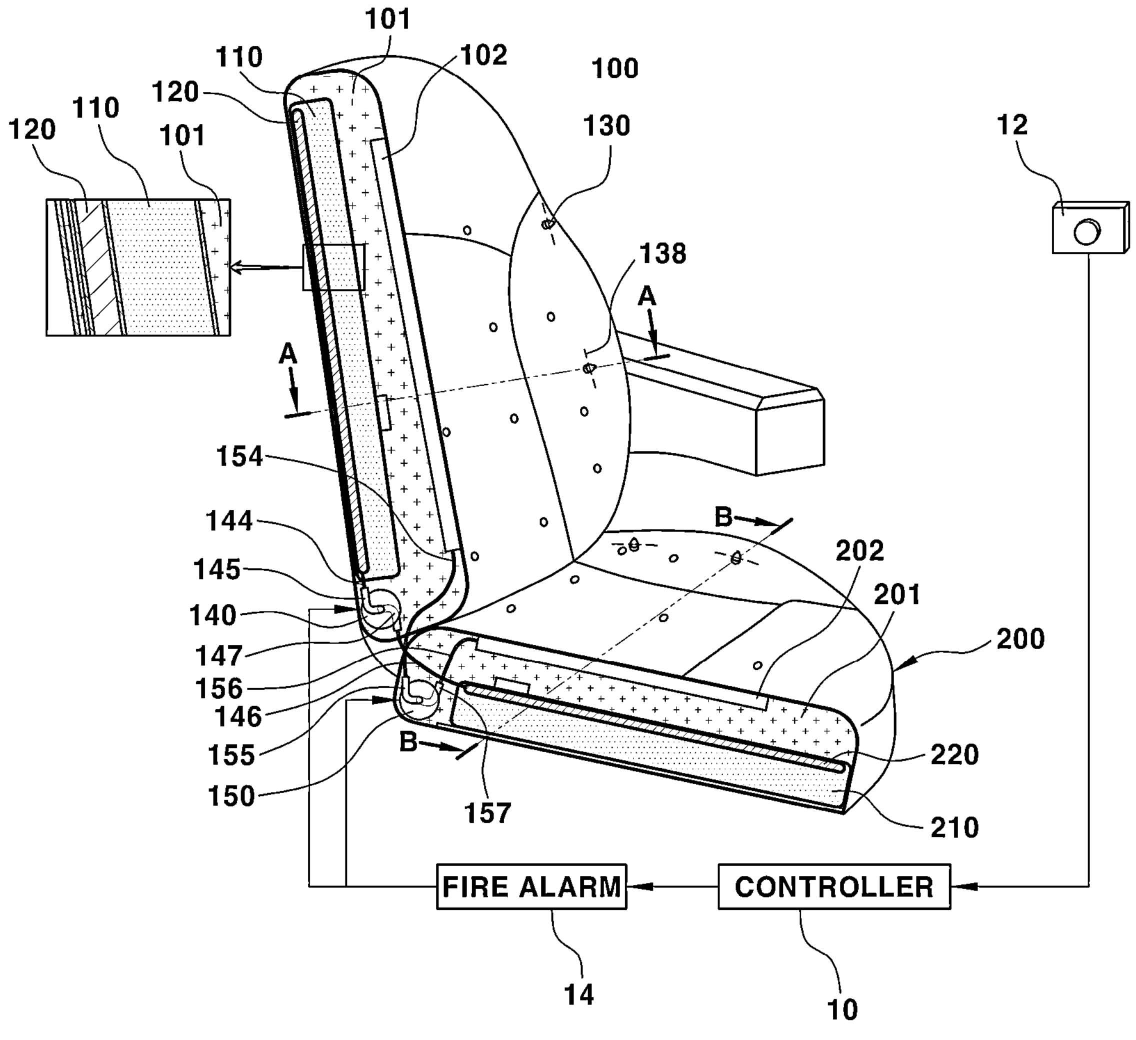
FIG. 1 is a cross-sectional perspective view showing a state in which a vehicle fire-extinguishing and passenger-cooling device according to the present disclosure is installed on a seat.

It should be understood that the appended drawings are not necessarily drawn to scale, presenting a somewhat simplified representation of various features illustrative of the basic principles of the disclosure. The specific design features of the present disclosure as disclosed herein, including, for example, specific dimensions, orientations, locations, and shapes should be determined in part by the particular intended application and use environment.

In the figures, reference numbers refer to the same or equivalent parts of the present disclosure throughout the several figures of the drawing.

DETAILED DESCRIPTION

Specific structural or functional descriptions given in connection with the embodiments of the present disclosure are merely illustrative for the purpose of describing embodiments according to the concept of the present disclosure. The embodiments according to the concept of the present disclosure may be implemented in various forms. Further, it should be understood that the present description is not intended to limit the disclosure to the embodiments. On the contrary, the disclosure is intended to cover not only the embodiments, but also various alternatives, modifications, equivalents, and other embodiments, which may be included within the spirit and scope of the present disclosure as defined by the appended claims.

In the present disclosure, terms such as “first” and/or “second” may be used to describe various components, but the components are not limited by the terms. The terms are used only for the purpose of distinguishing one component from other components. For example, a first component may be referred to as a second component, and similarly, a second component may also be referred to as a first component without departing from the scope of rights according to the concept of the present disclosure.

When one component is referred to as being “connected” or “joined” to another component, the one component may be directly connected or joined to the other component, but it should be understood that other components may be present therebetween. On the other hand, when the one component is referred to as being “directly connected to” or “directly in contact with” the other component, it should be understood that other components are not present therebetween. Other expressions for the description of relationships between components, that is, “between” and “directly between” or “adjacent to” and “directly adjacent to,” should be interpreted in the same manner.

The same reference numerals represent the same components throughout the specification. Additionally, the terms in the specification are used merely to describe embodiments, and are not intended to limit the present disclosure. In this specification, an expression in a singular form also includes a plural form, unless clearly specified otherwise in context. As used herein, expressions such as “comprise” and/or “comprising” do not exclude the presence or addition of one or more components, steps, operations, and/or elements other than those described.

When a controller, component, device, element, part, unit, module, or the like of the present disclosure is described as having a purpose or performing an operation, function, or the like, the controller, component, device, element, part, unit, or module should be considered herein as being “configured to” meet that purpose or perform that operation or function. Each controller, component, device, element, part, unit, module, and the like may separately embody or be included with a processor and a memory, such as a non-transitory computer-readable media, as part of the apparatus.

Hereinafter, embodiments of the present disclosure will be described in detail with reference to the accompanying drawings.

Figure 2:
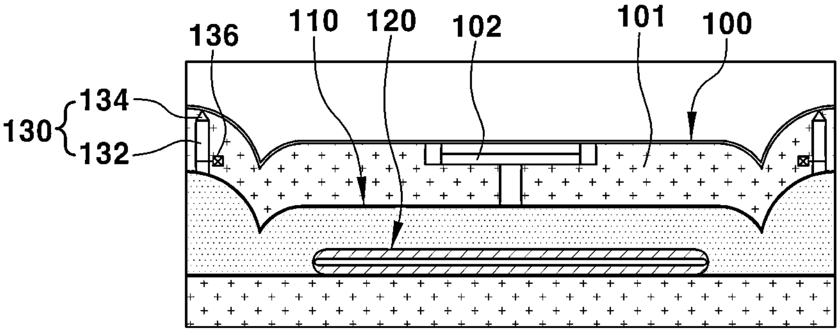
FIG. 2 is a cross-sectional view taken along line A-A in FIG. 1.
Figure 3:
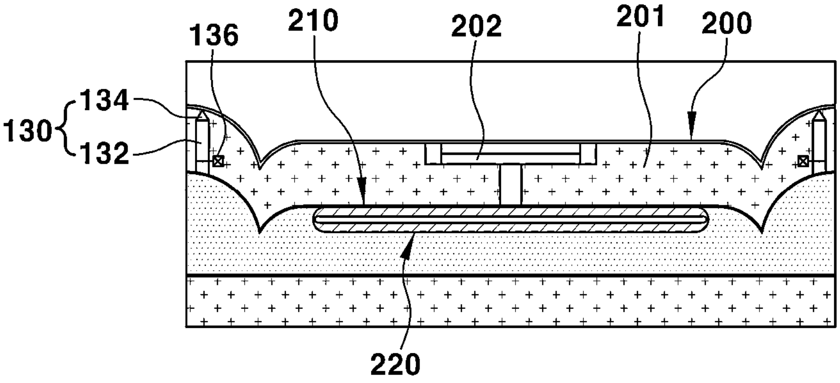
FIG. 3 is a cross-sectional view taken along line B-B in FIG. 1.

FIG. 1 is a cross-sectional perspective view showing a state in which a vehicle fire-extinguishing and passenger-cooling device according to the present disclosure is installed on a seat. FIG. 2 is a cross-sectional view taken along line A-A in FIG. 1. FIG. 3 is a cross-sectional view taken along line B-B in FIG. 1.

As shown in FIG. 1, a fire detector 12 that detects a fire is installed at a predetermined location of a vehicle. The fire detector 12 may be a thermal imaging camera mounted on a rear-view mirror of the vehicle or a side-view mirror thereof.

The fire detector 12 serves as a thermal imaging camera and is mounted on a rear-view mirror of a vehicle to detect fire and smoke in the vehicle in which a passenger is present.

Accordingly, the thermal imaging camera, which is the fire detector 12, may detect heat above a predetermined temperature or flames above a predetermined size caused by a vehicle fire.

In this case, a fire detection signal detected by the fire detector 12 is output to a controller 10.

Additionally, a vehicle seat may have a fire alarm 14 mounted thereon at a predetermined position thereof and configured to output a fire detection alarm sound in response to a control signal from the controller 10.

Accordingly, after receiving the fire detection signal from the fire detector 12, the controller 10 applies the operation control signal to the fire alarm 14. The fire alarm 14 outputs the fire detection alarm sound. As a result, the fire alarm 14 enables a passenger to easily recognize that a fire has occurred in the vehicle. Accordingly, the passenger may attempt to escape from the vehicle.

The present disclosure sprays fire-extinguishing fluid around a seatback of a seat and a seat cushion thereof before and after a passenger primarily attempts to escape from a vehicle. Simultaneously, the present disclosure allows cooling nitrogen gas to be discharged through a ventilation channel formed in a foam pad of the seatback and the seat cushion. As a result, the present disclosure makes it possible not only to protect the passenger seated on a seat from flames, but also to protect the passenger from possible burns caused by flames. In this manner, a passenger may be encouraged to safely escape from a vehicle, and time may be reliably secured for the passenger to escape from the vehicle.

To this end, a first fire-extinguishing fluid filling bag 110 is installed in a seatback 100 of a vehicle seat, as shown in FIGS. 1 and 2. Additionally, a first gas filling bag 120 is attached to an inner portion of the first fire-extinguishing fluid filling bag 110 in an inflatable manner. In addition, as shown in FIGS. 1 and 3, a second fire-extinguishing fluid filling bag 210 is installed in a seat cushion 200 of the vehicle seat, and a second gas filling bag 220 is attached to an inner portion of the second fire-extinguishing fluid filling bag 210 in an inflatable manner.

Additionally, the first fire-extinguishing fluid filling bag 110 and the second fire-extinguishing fluid filling bag 210 are each equipped with a plurality of spray nozzles 130 configured to spray fire-extinguishing fluid to the outside of the seat.

More specifically, each spray nozzle 130 is formed of a nozzle bar 132 having a predetermined length, in which the nozzle bar 132 is mounted on the front end of the first fire-extinguishing fluid filling bag 110 and is also mounted on the upper end of the second fire-extinguishing fluid filling bag 210. Additionally, each spray nozzle 130 includes a nozzle tip 134 sharply formed at the end of the nozzle bar 132 so as to penetrate a seat cover.

In this case, the nozzle bar 132 of the spray nozzle 130 mounted on the front end of the first fire-extinguishing fluid filling bag 110 may be moved forwards by the inflation pressure of the first fire-extinguishing fluid filling bag 110. Subsequently, the nozzle tip 134 may penetrate a seat cover covering the seatback 100 so as to be exposed to the outside. Further, the nozzle bar 132 of the spray nozzle 130 mounted on the upper end of the second fire-extinguishing fluid filling bag 210 may be moved forwards by inflation pressure of the second fire-extinguishing fluid filling bag 210. Subsequently, the nozzle tip 134 may penetrate a seat cover covering the seat cushion 200 so as to be exposed to the outside.

Preferably, a cutting line 138 is formed on the seat cover covering the seatback 100 and the seat cushion 200. Accordingly, when the nozzle bar 132 is moved forwards, the nozzle tip 134 may be easily exposed to the outside by cutting the cutting line 138.

Therefore, when the first gas filling bag 120 is inflated, the first fire-extinguishing fluid filling bag 110 is inflated, and pressure is applied to fire-extinguishing fluid in the first fire-extinguishing fluid filling bag 110. Thereafter, the nozzle bar 132 of the spray nozzle 130 mounted on the front end of the first fire-extinguishing fluid filling bag 110 is moved forwards, and the nozzle tip 134 penetrates a seat cover covering a bolster portion of the seatback 100 so as to be exposed to the outside. Subsequently, the fire-extinguishing fluid in the first fire-extinguishing fluid filling bag 110 may be sprayed around the seatback through the nozzle tip 134.

Simultaneously, when the second gas filling bag 220 is inflated, the second fire-extinguishing fluid filling bag 210 is inflated, and pressure is applied to fire-extinguishing fluid in the second fire-extinguishing fluid filling bag 210. Thereafter, the nozzle bar 132 of the spray nozzle 130 mounted on the front end of the second fire-extinguishing fluid filling bag 210 is moved forwards, and the nozzle tip 134 penetrates a seat cover covering a bolster portion of the seat cushion 200 so as to be exposed to the outside. Subsequently, the fire-extinguishing fluid in the second fire-extinguishing fluid filling bag 210 may be sprayed around the seat cushion through the nozzle tip 134.

Preferably, each nozzle bar 132 may have an electric valve 136 mounted thereon and opened by a control signal from the controller 10.

Accordingly, the electric valve 136 is opened only when the fire-extinguishing fluid in the first fire-extinguishing fluid filling bag 110 and the second fire-extinguishing fluid filling bag 210 is sprayed to the outside. Normally, the electric valve 136 is maintained in a closed state so as to prevent external leakage of the fire-extinguishing fluid.

Figure 8:
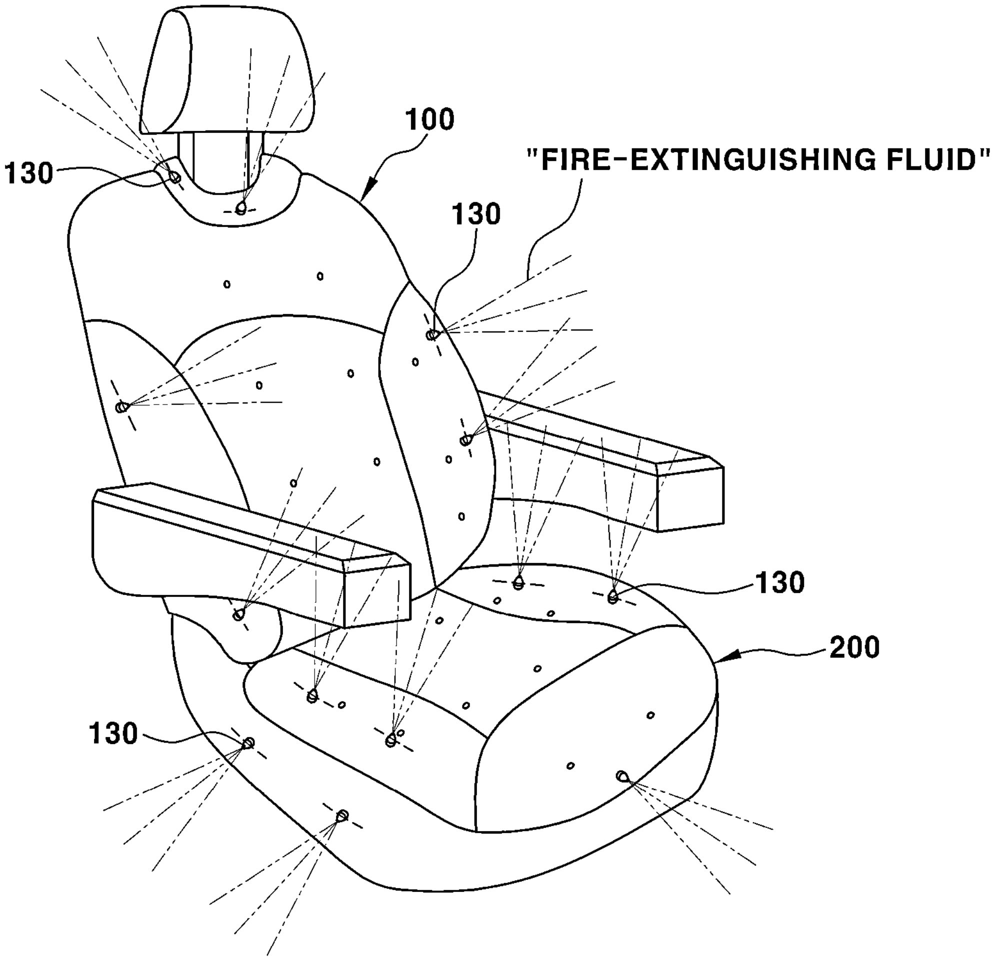
FIG. 8 is a perspective view showing a state in which fire-extinguishing fluid is sprayed around the seat by a vehicle fire-extinguishing and passenger-cooling device according to the present disclosure.
Figure 9:
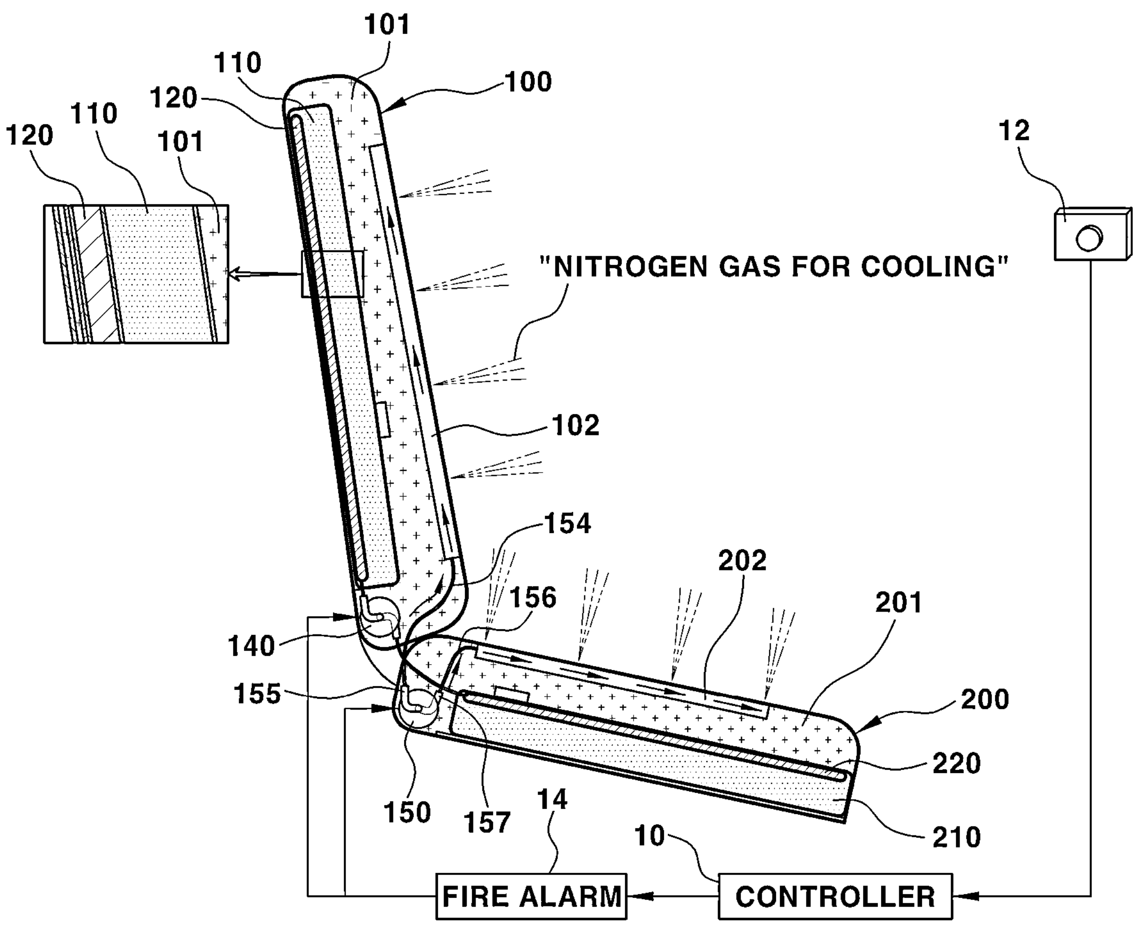
FIG. 9 is a cross-sectional view showing an operation of spraying nitrogen for cooling by a vehicle fire-extinguishing and passenger-cooling device according to the present disclosure.

Preferably, a spray nozzle 130 may also be mounted at a rear top position of the seatback 100 so that the fire-extinguishing fluid is sprayed toward the rear of a headrest, as shown in FIG. 8. The same may be further mounted in side covers of the seat cushion so that the fire-extinguishing fluid is sprayed toward the opposite sides of the seat cushion.

The seatback 100 has a first gas generator 140 installed at a predetermined position of the inside thereof and configured to inflate the first gas filling bag 120 and the second gas filling bag 220.

Figure 4:
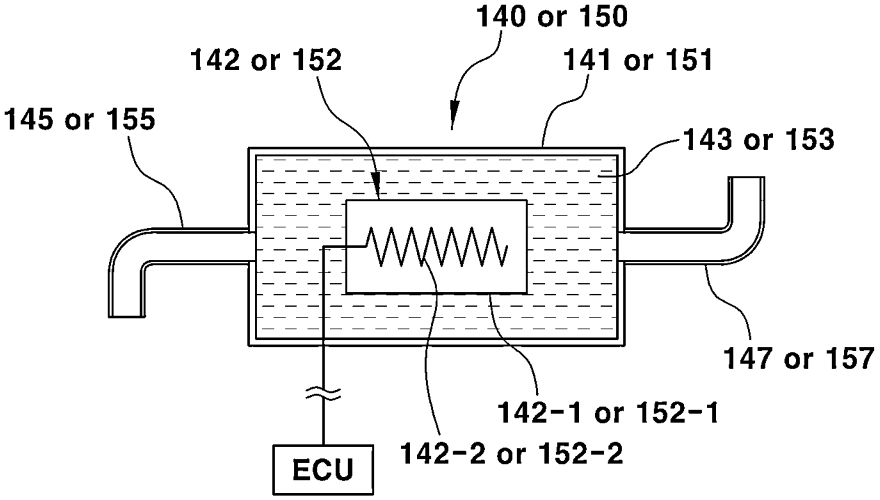
FIGS. 4 and 5 are partial cross-sectional perspective views showing a nitrogen generator in the vehicle fire-extinguishing and passenger-cooling device according to the present disclosure.
Figure 5:
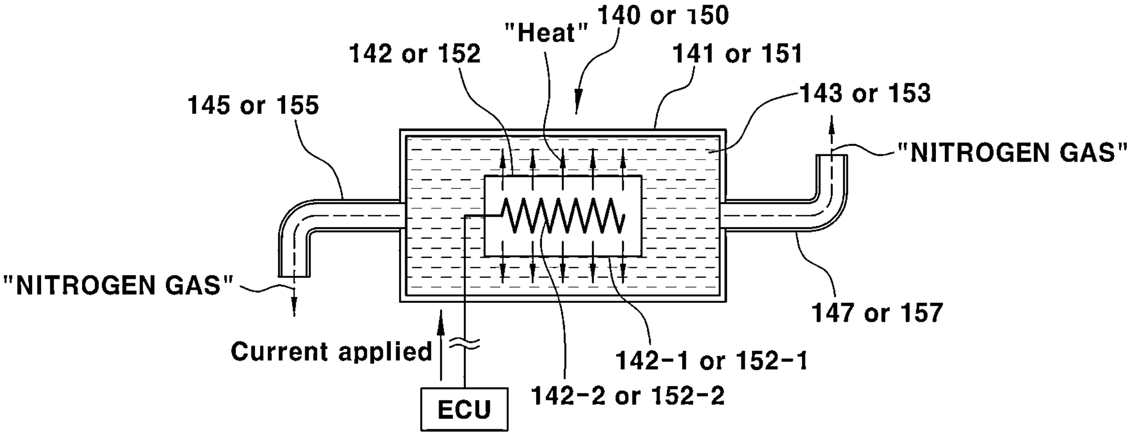

Referring to FIGS. 4 and 5, the first gas generator 140 is adopted to generate nitrogen gas with which the first gas filling bag 120 and the second gas filling bag 220 are to be filled. The first gas generator may include a housing 141 having a predetermined shape mounted in the seatback 100, and an igniter 142 inserted into the housing 141 and configured to generate heat when current is applied by the controller 10. The first gas generator may also include a propellant 143 filling a peripheral portion of the igniter 142 in the housing 141 and generating nitrogen gas for spraying of the fire-extinguishing fluid by the heat generated by the igniter 142.

In addition, the housing 141 has a 1-1 discharge nozzle 145 mounted on one end thereof and connected to the first gas filling bag 120 via a 1-1 connection hose 144. Further, the housing 141 has a 1-2 discharge nozzle 147 mounted on the other end thereof and connected to the second gas filling bag 220 via a 1-2 connection hose 146.

Preferably, the igniter 142 may be a nickel-plated wire 142-2 that rapidly generates heat due to resistance when current is applied by the controller 10.

Accordingly, heat generated from the nickel-plated wire 142-2 may be directly transferred to the propellant 143.

Alternatively, the igniter 142 may be formed of a case 142-1 made of a material such as aluminum having excellent heat transfer and the nickel-plated wire 142-2 disposed in the case 142-1. The nickel-plated wire 142-2 is configured to rapidly generate heat due to resistance when current is applied by the controller 10.

Accordingly, the heat generated from the nickel-plated wire 142-2 may be transferred to the propellant 143 through the case 142-1.

Preferably, the propellant 143 is a material that reacts with heat and generates nitrogen gas. The propellant 143 may be a material obtained by mixing sodium azide ($NaN_3$) and an oxidizing agent, compressing a mixture thereof, and solidifying the mixture.

For reference, the sodium azide is used as a nitrogen gas generating material for deployment of a vehicle airbag.

Accordingly, heat is transferred from the igniter 142 to the propellant 143, and a rapid chemical explosion reaction (e.g., a flame chain reaction) occurs from a material obtained by mixing sodium azide and an oxidizing agent, compressing a mixture thereof, and solidifying the mixture. In this manner, nitrogen gas is generated.

Figure 6:
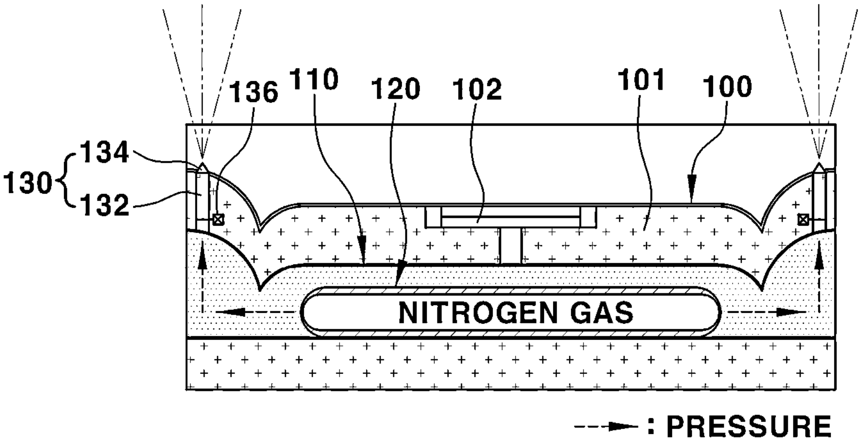
FIGS. 6 and 7 are cross-sectional views showing an operation of spraying fire-extinguishing fluid around the seat by a vehicle fire-extinguishing and passenger-cooling device according to the present disclosure.

Therefore, when the first gas filling bag 120 is filled with the nitrogen gas generated by the propellant 143 from the 1-1 discharge nozzle 145 via the 1-1 connection hose 144, as shown in FIG. 6, the first gas filling bag 120 is inflated.

Subsequently, when the first gas filling bag 120 is inflated, the first fire-extinguishing fluid filling bag 110 is inflated, and simultaneously, pressure is applied to the fire-extinguishing fluid in the first fire-extinguishing fluid filling bag 110. Accordingly, the nozzle bar 132 of the respective spray nozzle 130 mounted on the front end of the first fire-extinguishing fluid filling bag 110 is moved forwards, and simultaneously, the nozzle tip 134 of each spray nozzle 130 penetrates a seat cover covering a bolster portion of the seatback 100 and is exposed to the outside. As a result, this configuration allows the fire-extinguishing fluid in the first fire-extinguishing fluid filling bag 110 to be sprayed around the seatback through each nozzle tip 134.

Figure 7:
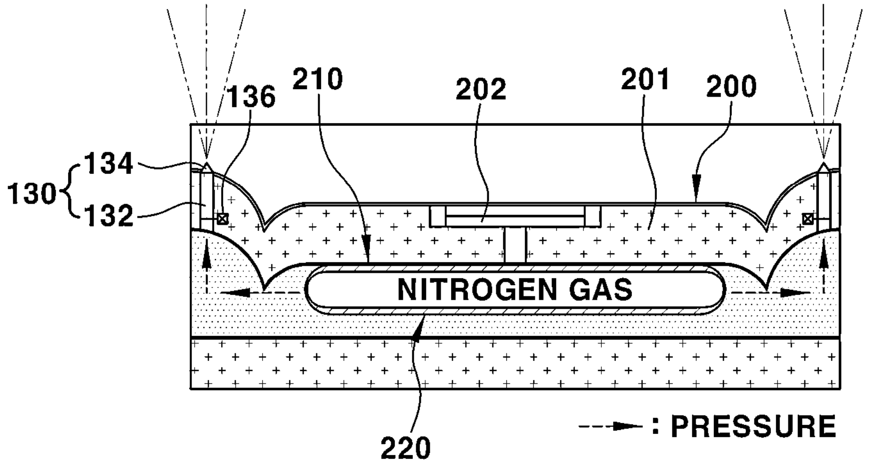

In addition, when the second gas filling bag 220 is filled with the nitrogen gas generated by the propellant 143 from the 1-2 discharge nozzle 147 via the 1-2 connection hose 146, as shown in FIG. 7, the second gas filling bag 220 is inflated.

Subsequently, when the second gas filling bag 220 is inflated, the second fire-extinguishing fluid filling bag 210 is inflated, and simultaneously, pressure is applied to the fire-extinguishing fluid in the second fire-extinguishing fluid filling bag 210. Accordingly, the nozzle bar 132 of each spray nozzle 130 mounted on the upper end of the second fire-extinguishing fluid filling bag 210 is moved forwards, and simultaneously, the nozzle tip 134 of each spray nozzle 130 penetrates a seat cover covering a bolster portion of the seat cushion 200 and is exposed to the outside. As a result, the configuration allows the fire-extinguishing fluid in the second fire-extinguishing fluid filling bag 210 to be sprayed around the seat cushion through each nozzle tip 134.

The seat cushion 200 has a second gas generator 150 installed at a predetermined position of the inside thereof and configured to generate cooling gas so as to supply a ventilation channel 102 formed in a foam pad 101 of the seatback 100 and a ventilation channel 202 formed in a foam pad 201 of the seat cushion 200.

Referring to the attached FIGS. 4 and 5, the second gas generator 150 is also used to generate nitrogen gas for cooling. The second gas generator 150 may be formed of a housing 151 having a predetermined shape mounted in the seat cushion 200, and an igniter 152 inserted into the housing 151 and configured to generate heat when current is applied by the controller 10. The second gas generator 150 also includes a propellant 153 filling a peripheral portion of the igniter 152 in the housing 151 and generating nitrogen gas for spraying of the fire-extinguishing fluid by heat generated by the igniter 152.

In addition, the housing 151 has a 2-1 discharge nozzle 155 mounted on one end thereof and connected to the ventilation channel 102 formed in the foam pad 101 of the seatback 100 via a 2-1 connection hose 154. Further, the housing 151 has a 2-2 discharge nozzle 157 mounted on the other end thereof and connected to the ventilation channel 202 formed in the foam pad 201 of the seat cushion 200 via a 2-2 connection hose 156.

Preferably, the igniter 152 may be a nickel-plated wire 152-2 that rapidly generates heat due to resistance when current is applied by the controller 10. Accordingly, the heat generated from the nickel-plated wire 152-2 may be directly transferred to the propellant 153.

Further, the igniter 152 may be formed of a case 152-1 made of a material such as aluminum having excellent heat transfer and the nickel-plated wire 152-2 disposed in the case 152-1. The nickel-plated wire 152-2 is configured to rapidly generate heat due to resistance when current is applied by the controller 10.

Accordingly, the heat generated from the nickel-plated wire 152-2 may be transferred to the propellant 153 through the case 152-1.

Preferably, the propellant 153 is a material that reacts with heat and generates nitrogen gas. The propellant 153 may be a material obtained by mixing sodium azide ($NaN_3$) and an oxidizing agent, compressing a mixture thereof, and solidifying the mixture.

Accordingly, heat is transferred from the igniter 152 to the propellant 153, and a rapid chemical explosion reaction (e.g., a flame chain reaction) occurs from a material obtained by mixing sodium azide and an oxidizing agent, compressing a mixture thereof, and solidifying the mixture. In this manner, nitrogen gas is generated.

Accordingly, the nitrogen gas generated by the propellant 153 of the second gas generator 150 may be discharged from the 2-1 discharge nozzle 155 to the ventilation channel 102 formed in the foam pad 101 of the seatback 100 via the 2-1 connection hose 154. Simultaneously, the nitrogen gas generated by the propellant 153 may be discharged from the 2-2 discharge nozzle 157 to the ventilation channel 202 formed in the foam pad 201 of the seat cushion 200 via the 2-2 connection hose 156.

Subsequently, the cooling nitrogen gas discharged through the ventilation channel 102 formed in the foam pad 101 of the seatback 100 is sprayed toward the upper body of a passenger through a ventilation hole formed in the seat cover of the seatback 100. Simultaneously, the cooling nitrogen gas discharged through the ventilation channel 202 formed in the foam pad 201 of the seat cushion 200 is sprayed toward the lower body of the passenger through a ventilation hole formed in the seat cover of the seat cushion 200. As a result, the configuration makes it possible to cool the passenger's body. In this manner, a passenger may be protected from a risk of burns caused by flames.

An operation flow of the vehicle fire-extinguishing and passenger-cooling device of the present disclosure having the above-described configuration is sequentially described as follows.

First, fire occurrence is detected by a thermal imaging camera, which is the fire detector 12, while a vehicle is driving or parked.

In other words, the thermal imaging camera, which is the fire detector 12, detects heat above a predetermined temperature or flames above a predetermined size caused by a vehicle fire, and outputs a fire detection signal to the controller 10.

Accordingly, after receiving the fire detection signal from the fire detector 12, the controller 10 applies an operation control signal to the fire alarm 14. Thereafter, the fire alarm 14 makes a fire detection alarm sound, and a passenger may easily recognize fire occurrence in the vehicle.

Additionally, the controller 10 controls current to be applied to each of the first gas generator 140 and the second gas generator 150.

Subsequently, when current is applied to the first gas generator 140 by the controller 10, heat is rapidly generated due to resistance in the nickel-plated wire 142-2 of the igniter 142 of the first gas generator 140. The heat generated by the nickel-plated wire 142-2 is transferred to the propellant 143 of the first gas generator 140.

Simultaneously, when current is applied to the second gas generator 150 by the controller 10, heat is rapidly generated due to resistance in the nickel-plated wire 152-2 of the igniter 152 of the second gas generator 150. The heat generated by the nickel-plated wire 152-2 is transferred to the propellant 153 of the second gas generator 150.

Subsequently, the heat is transferred from the igniter 142 of the first gas generator 140 to the propellant 143, and a rapid chemical explosion reaction occurs from a material obtained by mixing sodium azide and an oxidizing agent, compressing a mixture thereof, and solidifying the mixture, thereby generating nitrogen gas for spraying of fire-extinguishing fluid.

Simultaneously, the heat is transferred from the igniter 152 of the second gas generator 150 to the propellant 153, and a rapid chemical explosion reaction occurs from a material obtained by mixing sodium azide and an oxidizing agent, compressing a mixture thereof, and solidifying the mixture, thereby generating nitrogen gas for passenger cooling.

Subsequently, when the first gas filling bag 120 is filled with the nitrogen gas generated by the propellant 143 of the first gas generator 140 from the 1-1 discharge nozzle 145 via the 1-1 connection hose 144, the first gas filling bag 120 is inflated. Further, when the second gas filling bag 220 is filled with the nitrogen gas generated by the propellant 143 of the first gas generator 140 from the 1-2 discharge nozzle 147 via the 1-2 connection hose 146, the second gas filling bag 220 is also inflated.

Accordingly, when the first gas filling bag 120 is inflated, the first fire-extinguishing fluid filling bag 110 is inflated, and simultaneously, pressure is applied to fire-extinguishing fluid in the first fire-extinguishing fluid filling bag 110. Thereafter, the nozzle bar 132 of the spray nozzle 130 mounted on the front end of the first fire-extinguishing fluid filling bag 110 is moved forwards, and simultaneously, the nozzle tip 134 of each spray nozzle 130 penetrates a seat cover covering a bolster portion of the seatback 100 and is exposed to the outside. As a result, the configuration allows the fire-extinguishing fluid in the first fire-extinguishing fluid filling bag 110 to be sprayed around the seatback through each nozzle tip 134, as shown in FIG. 8.

Simultaneously, when the second gas filling bag 220 is inflated, the second fire-extinguishing fluid filling bag 210 is inflated, and pressure is applied to fire-extinguishing fluid in the second fire-extinguishing fluid filling bag 210. Thereafter, the nozzle bar 132 of each spray nozzle 130 mounted on the upper end of the second fire-extinguishing fluid filling bag 210 is moved forwards, and the nozzle tip 134 of each spray nozzle 130 penetrates a seat cover covering a bolster portion of the seat cushion 200 and is exposed to the outside. As a result, the configuration allows the fire-extinguishing fluid in the second fire-extinguishing fluid filling bag 210 to be sprayed around the seat cushion through the nozzle tip 134 of each spray nozzle 130, as shown in FIG. 8.

Additionally, as shown in FIG. 8, the fire-extinguishing fluid is sprayed toward the rear side of a headrest and toward the opposite sides of the seat cushion.

In this manner, when a vehicle fire occurs, the fire-extinguishing fluid in the first fire-extinguishing fluid filling bag 110 is sprayed around the seatback 100 through the spray nozzle, and the fire-extinguishing fluid in the second fire-extinguishing fluid filling bag 210 is sprayed around the seat cushion 200 through the spray nozzle. As a result, the configuration makes it possible not only to protect a passenger seated on a seat from flames, but also to encourage a passenger to safely escape from a vehicle.

Additionally, the nitrogen gas generated by the propellant 153 of the second gas generator 150 may be discharged from the 2-1 discharge nozzle 155 to the ventilation channel 102 formed in the foam pad 101 of the seatback 100 via the 2-1 connection hose 154. Simultaneously, the nitrogen gas generated by the propellant 153 may be discharged from the 2-2 discharge nozzle 157 to the ventilation channel 202 formed in the foam pad 201 of the seat cushion 200 via the 2-2 connection hose 156.

Accordingly, the cooling nitrogen gas discharged through the ventilation channel 102 formed in the foam pad 101 of the seatback 100 is sprayed toward the upper body of a passenger through a ventilation hole formed in a seat cover of the seatback 100. Simultaneously, the cooling nitrogen gas discharged through the ventilation channel 202 formed in the foam pad 201 of the seat cushion 200 is sprayed toward the lower body of the passenger through a ventilation hole formed in a seat cover of the seat cushion 200. As a result, the configuration makes it possible to cool the passenger's body. In this manner, a passenger may be protected from a risk of burns caused by flames.

As is apparent from the above description, the present disclosure provides the following effects.

First, in the event of a vehicle fire, fire-extinguishing fluid in a first fire-extinguishing fluid filling bag installed in a seatback is sprayed around the seatback through a spray nozzle. Simultaneously, fire-extinguishing fluid in a second fire-extinguishing fluid filling bag installed in a seat cushion is sprayed around the seat cushion through a spray nozzle. As a result, the configuration makes it possible not only to protect a passenger seated on a seat from flames, but also to encourage a passenger to safely escape from a vehicle.

Second, in the event of a vehicle fire, cooling nitrogen gas is discharged through a ventilation channel formed in a foam pad of a seatback and a ventilation channel formed in a foam pad of a seat cushion, thereby making it possible to cool the body of a passenger seated on a seat. In this manner, the passenger may be protected from a risk of burns caused by flames.

Although the present disclosure has been described in detail with reference to the embodiments thereof, the scope of the present disclosure is not limited to the above-described embodiments. It should be appreciated by those having ordinary skill in the art that changes may be made in these embodiments without departing from the principles and spirit of the disclosure, the scope of which is defined in the appended claims and equivalents thereto.

What is claimed is:

1. A vehicle fire-extinguishing and passenger-cooling device comprising:
- a fire detector mounted at a position of a vehicle and configured to detect a fire;
- a first fire-extinguishing fluid filling bag installed in a seatback of a seat;
- a first gas filling bag attached to an inner portion of the first fire-extinguishing fluid filling bag and configured to be inflatable in the first fire-extinguishing fluid filling bag;
- a second fire-extinguishing fluid filling bag installed in a seat cushion of the seat;
- a second gas filling bag attached to an inner portion of the second fire-extinguishing fluid filling bag and configured to be inflatable in the second fire-extinguishing fluid filling bag;
- a plurality of spray nozzles mounted in the first fire-extinguishing fluid filling bag and the second fire-extinguishing fluid filling bag and configured to spray fire-extinguishing fluid to an outside of the seat;
- a first gas generator mounted in the seat and configured to generate gas to fill the first gas filling bag and the second gas filling bag;
- a second gas generator mounted in the seat and configured to generate cooling gas to be supplied to a ventilation channel formed in a foam pad of each of the seatback and the seat cushion; and
- a controller configured to receive a fire detection signal from the fire detector and configured to send a current signal for gas generation to the first gas generator and the second gas generator.

2. The vehicle fire-extinguishing and passenger-cooling device of claim 1, wherein the fire detector is a thermal imaging camera mounted on a rear-view mirror of the vehicle or a side-view mirror thereof.

3. The vehicle fire-extinguishing and passenger-cooling device of claim 1, further comprising a fire alarm configured to output a fire detection alarm sound based on a control signal from the controller.

4. The vehicle fire-extinguishing and passenger-cooling device of claim 1, wherein each spray nozzle of the plurality of spray nozzles comprises:
- a nozzle bar having a predetermined length, wherein the nozzle bar is mounted on a front end of the first fire-extinguishing fluid filling bag or an upper end of the second fire-extinguishing fluid filling bag; and
- a nozzle tip sharply formed at an end of the nozzle bar so as to penetrate a seat cover.

5. The vehicle fire-extinguishing and passenger-cooling device of claim 4, wherein the nozzle bar has an electric valve mounted thereon and configured to open and close based on a control signal from the controller.

6. The vehicle fire-extinguishing and passenger-cooling device of claim 4, wherein the seat cover has a cutting line formed thereon and cut by the nozzle tip when the nozzle bar is moved forwards.

7. The vehicle fire-extinguishing and passenger-cooling device of claim 1, wherein the first gas generator comprises:
- a housing having a predetermined shape, the housing being mounted in the seatback;
- an igniter inserted into the housing and configured to generate heat when current is applied by the controller;
- a propellant configured to fill a peripheral portion of the igniter in the housing and generate nitrogen gas for spraying of fire-extinguishing fluid by the heat generated by the igniter;
- a 1-1 discharge nozzle mounted on one end of the housing and connected to the first gas filling bag via a 1-1 connection hose; and
- a 1-2 discharge nozzle mounted on another end of the housing and connected to the second gas filling bag via a 1-2 connection hose.

8. The vehicle fire-extinguishing and passenger-cooling device of claim 7, wherein, when the first gas filling bag is filled with the nitrogen gas generated by the propellant from the 1-1 discharge nozzle via the 1-1 connection hose, the first gas filling bag is inflated such that the fire-extinguishing fluid filling the first fire-extinguishing fluid filling bag is sprayed around the seatback through the plurality of spray nozzles.

9. The vehicle fire-extinguishing and passenger-cooling device of claim 7, wherein, when the second gas filling bag is filled with the nitrogen gas generated by the propellant from the 1-2 discharge nozzle via the 1-2 connection hose, the second gas filling bag is inflated such that the fire-extinguishing fluid filling the second fire-extinguishing fluid filling bag is sprayed around the seat cushion through the plurality of spray nozzles.

10. The vehicle fire-extinguishing and passenger-cooling device of claim 7, wherein the propellant is obtained by mixing sodium azide and an oxidizing agent, compressing a mixture of the sodium azide and the oxidizing agent, and solidifying the mixture.

11. The vehicle fire-extinguishing and passenger-cooling device of claim 1, wherein the second gas generator comprises:

a housing having a predetermined shape, the housing being mounted in the seat cushion;

an igniter inserted into the housing and configured to generate heat when current is applied by the controller;

a propellant configured to fill a peripheral portion of the igniter in the housing and generate nitrogen gas for passenger cooling by the heat generated by the igniter;

a 2-1 discharge nozzle mounted on one end of the housing and connected to the ventilation channel formed in the foam pad of the seatback via a 2-1 connection hose; and a 2-2 discharge nozzle mounted on another end of the housing and connected to the ventilation channel formed in the foam pad of the seat cushion via a 2-2 connection hose.

12. The vehicle fire-extinguishing and passenger-cooling device of claim 11, wherein the nitrogen gas generated by the propellant is discharged from the 2-1 discharge nozzle to the ventilation channel formed in the foam pad of the seatback via the 2-1 connection hose, and simultaneously, the nitrogen gas generated by the propellant is discharged from the 2-2 discharge nozzle to the ventilation channel formed in the foam pad of the seat cushion via the 2-2 connection hose, thereby cooling a body of a passenger.

* * * * *